Jan. 30, 1962　　　A. G. BILEK　　　3,018,692
ROTATABLE ROCKET LAUNCHER

Filed Aug. 25, 1959　　　　　4 Sheets-Sheet 1

INVENTOR.
ANDREW G. BILEK
BY
ATTORNEYS

Jan. 30, 1962  A. G. BILEK  3,018,692
ROTATABLE ROCKET LAUNCHER
Filed Aug. 25, 1959  4 Sheets-Sheet 2

INVENTOR.
ANDREW G. BILEK
BY
ATTORNEYS

Jan. 30, 1962 A. G. BILEK 3,018,692
ROTATABLE ROCKET LAUNCHER
Filed Aug. 25, 1959 4 Sheets-Sheet 3
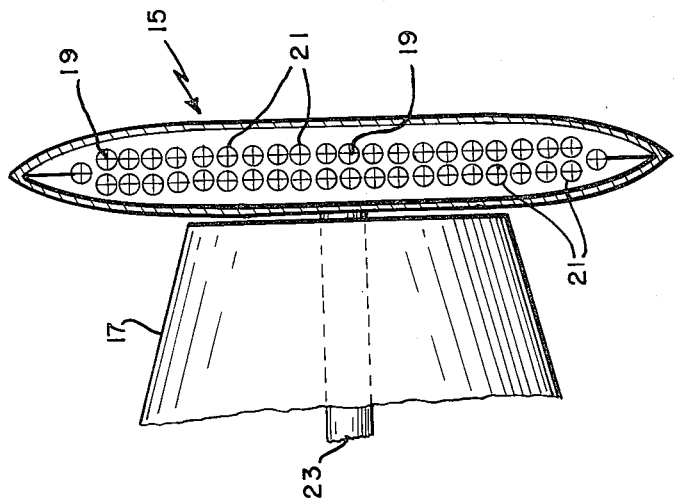
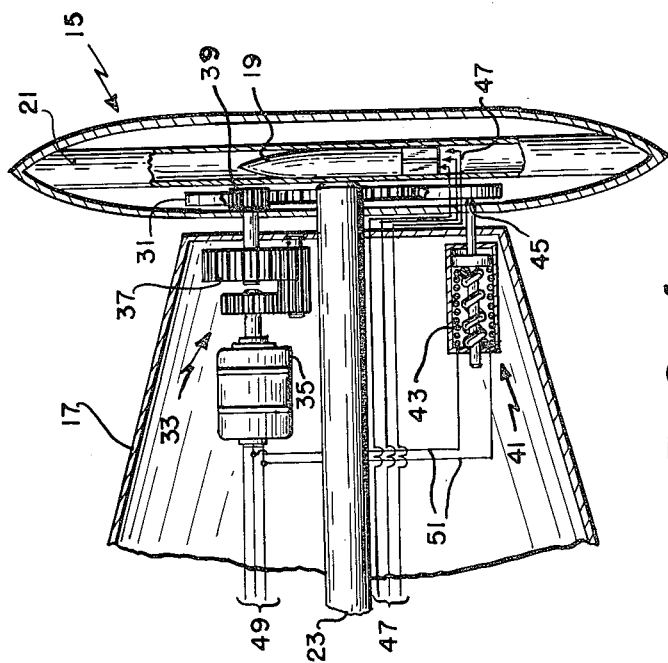
INVENTOR.
ANDREW G. BILEK
BY
ATTORNEYS Jan. 30, 1962 A. G. BILEK 3,018,692
ROTATABLE ROCKET LAUNCHER
Filed Aug. 25, 1959 4 Sheets-Sheet 4

INVENTOR.
ANDREW G. BILEK
BY
ATTORNEYS 3,018,692
Patented Jan. 30, 1962

3,018,692
ROTATABLE ROCKET LAUNCHER
Andrew G. Bilek, Valparaiso, Fla. (Hdq. APGC, Director of Ballistics PGRE, Eglin AFB, Fla.)
Filed Aug. 25, 1959, Ser. No. 836,040
2 Claims. (Cl. 89—1.7)
(Granted under Title 35, U.S. Code (1952), sec. 266)

The invention described herein may be manufactured and used by or for the United States Government for governmental purposes without payment to me of any royalty thereon.

This invention relates to rocket launchers and more particularly to a rotatable rocket launcher of aerodynamically clean configuration which can be mounted on the wing tips of high performance aircraft and which is designed for semi-automatic operation in conjunction with an electronic fire control system coupled with the aircraft navigational system.

In the armament of present day military aircraft for both offensive and defensive missions, it is highly desirable to utilize the modern rockets and missiles which are available. Generally, aircraft rockets are launched from tubes mounted on the underside of the wings parallel to the longitudinal center line of the aircraft. It is also known that rockets may be mounted in pods located on the wing tips and shaped similarly to auxiliary fuel tanks. Rockets mounted in the above described manner are aimed and launched so as to leave the aircraft in a direction dependent on attitude of the launching aircraft. That is, the direction of the rocket is controlled by the direction in which the aircraft is travelling.

In the present invention, the rockets may be fired at any elevation direction independent of the attitude of the aircraft. A circular area of 360° elevation can be covered by the rocket launcher herein described which means that rockets may be launched forward, rearward, upward, or downward and intermediate directions therebetween.

Accordingly, it is an object of the present invention to provide a rocket launcher which is capable of launching a rocket or missile in any chosen elevation direction regardless of the attitude of the aircraft upon which it is mounted.

Another object of the invention is to provide a rotatable rocket launcher which can be mounted upon the wing tips of an aircraft and which is aerodynamically clean having little or no adverse effect on the operation and maneuverability of the aircraft.

Still another object of the invention is to provide a rocket launcher which can operate in conjunction with an electronic fire control system coupled to a navigational system. These systems would serve to trigger the firing circuit.

A still further object of the invention is to provide a rocket launcher which is particularly suited for aiming and launching rockets from aircraft flying straight and level at low altitudes and high speeds against ground installation targets. However, because of several novel features, the invention is also effective as an air-to-air weapon against attacking aircraft or guided missiles.

These and other objects, features and advantages will become more apparent from the following description taken in conjunction with the accompanying drawings wherein:

FIG. 4 is a top view of one embodiment of the invention including a schematic diagram of a control system for aiming and launching the rockets;

FIG. 5 shows an alternate rocket tube arrangement in which the rockets are placed in a double row allowing greater storage capacity and firepower.

Figure 1:
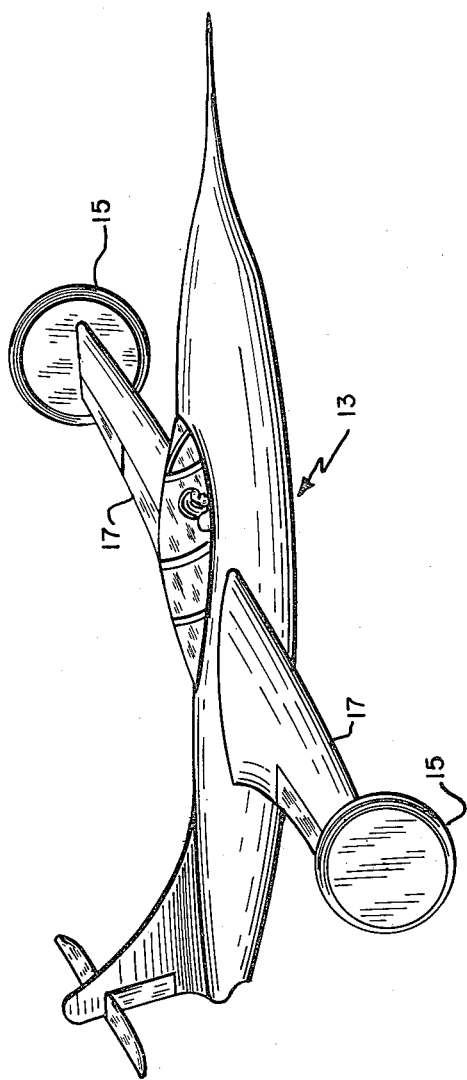
FIG. 1 is a view in perspective of an aircraft equipped with rotatable rocket launchers of the type according to the present invention.

Referring to FIG. 1 which shows a view in perspective of a winged aircraft 13 equipped with rotatable rocket pods 15 according to the invention on tips of the wings 17. In normal operation, the action of the launchers is controlled by the fire control system and navigational system. The firing circuit is triggered by impulses dependent on information computed and relayed by these systems.

Detailed views of the rocket pods 15 are shown in FIGS. 2–5. The rockets 19 are mounted in rocket tubes 21 which are in general parallel relationship to each other. The rocket pod 15 is so constructed and arranged as to be rotatable about its geometrical center. This permits the rocket tubes 21 with the rockets 19 therein contained to be aimed in any elevation direction allowing the rockets to be fired upward, downward, rearward or forward or any intermediate direction. The rocket pod 15 may be rotatably attached to the tip of the wing 17 by a tubular shaft member 23. A piece of flexible material 25 is disposed between the pod 15 and wing tip acting as a seal as well as fairing to smooth the outline and reduce drag at this point.

Figure 3:
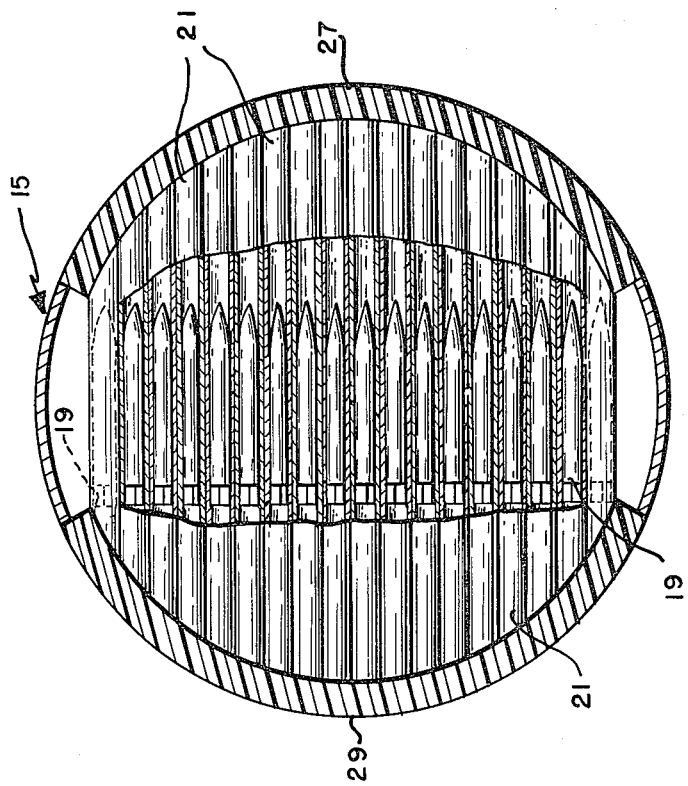
FIG. 3 is a side view of the launcher pod showing one arrangement for storing the rockets therein.
Figure 2:
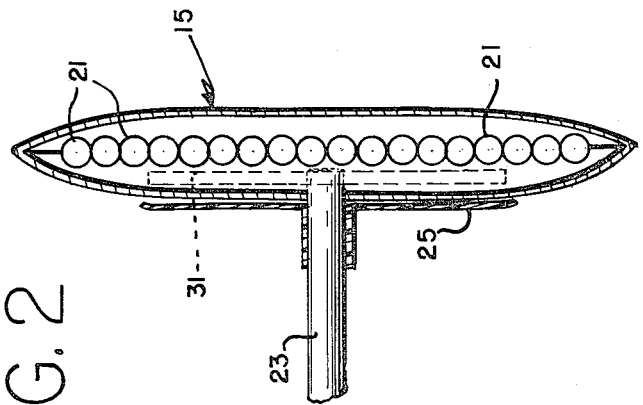
FIG. 2 is a front elevation of the rotatable launcher pod showing the position of the rocket tubes set to compensate for precession and including the axle shaft for rotating the pod.

The rockets 19 may be located in the pod 15 in the arrangement shown in FIG. 3 which shows the launcher in side elevation. The nose section 27 of the pod 15 is frangible to allow for the release and discharge of the rocket 19 after it has been triggered. The trailing edge 29 is releasable and is adapted to be automatically jettisoned by the exhaust of the first rocket fired; however, when the pod 15 is in rearward firing position it is desirable to maintain trailing edge 29 fixed to the pod.

One method of operation of the invention is shown in FIG. 4 which shows a top view of the pod 15 attached to the wing tip of an aircraft. The rocket 19 is disposed in the rocket tube 21 in position for launching. The tubular shaft 23 passes into the aircraft wing 17 and its other end is preferably attached to an internal ring gear 31 which is fixed to the pod 15. Also in the wing tip section is a drive system 33 which includes an electric motor 35 and a reduction gear transmission 37. The pinion gear 39 extends from the transmission 37 and engages the ring gear 31. An electrically operated index pin actuator 41 which includes a solenoid 43 and an index pin 45. The pin actuator 41 operates in conjunction with the drive system 33 to provide positive locking of the rocket pod 15 in firing position.

The rockets are fired by electrical impulses from a fire control system (not shown). The signals pass along the leads 47 and may be connected to the rocket trigger mechanism through a commutator type distributor which allows the pod 15 with its rockets 19 to rotate and still retain electrical contact with the fire control system. The rotation of the pod 15 is controlled by a rotational control system (not shown) which relays a signal along the lead wires 49 to the electric motor 35. Another series of lead wires 51 connect the drive system 33 to the index pin actuator 41. This allows controlled interaction between the drive system 33 and index pin 45 so that the index pin is released immediately prior to energization of the electric motor 35 thereby allowing the pod 15 to rotate to a predetermined angular position. The index pin actuator 41 then receives a signal from the rotational control system to release the index pin 45 which locks the pod 15 from further rotation. A signal from the fire control system is then received by the trigger mechanism and one or more rockets is launched.

The above described mechanism can be permanently installed in the wing of the aircraft or as an alternative method can be installed as a separate assembly unit on the wing tip. In the latter case the launcher would be essentially an extension of the wing and could be removed or attached as conditions warranted.

The main tubular shaft 23 may be used as the drive means for rotating the launcher. If this method of driving is used the signal from the rotational control system would then be fed to a motor connected directly to the shaft 23.

Figure 6:
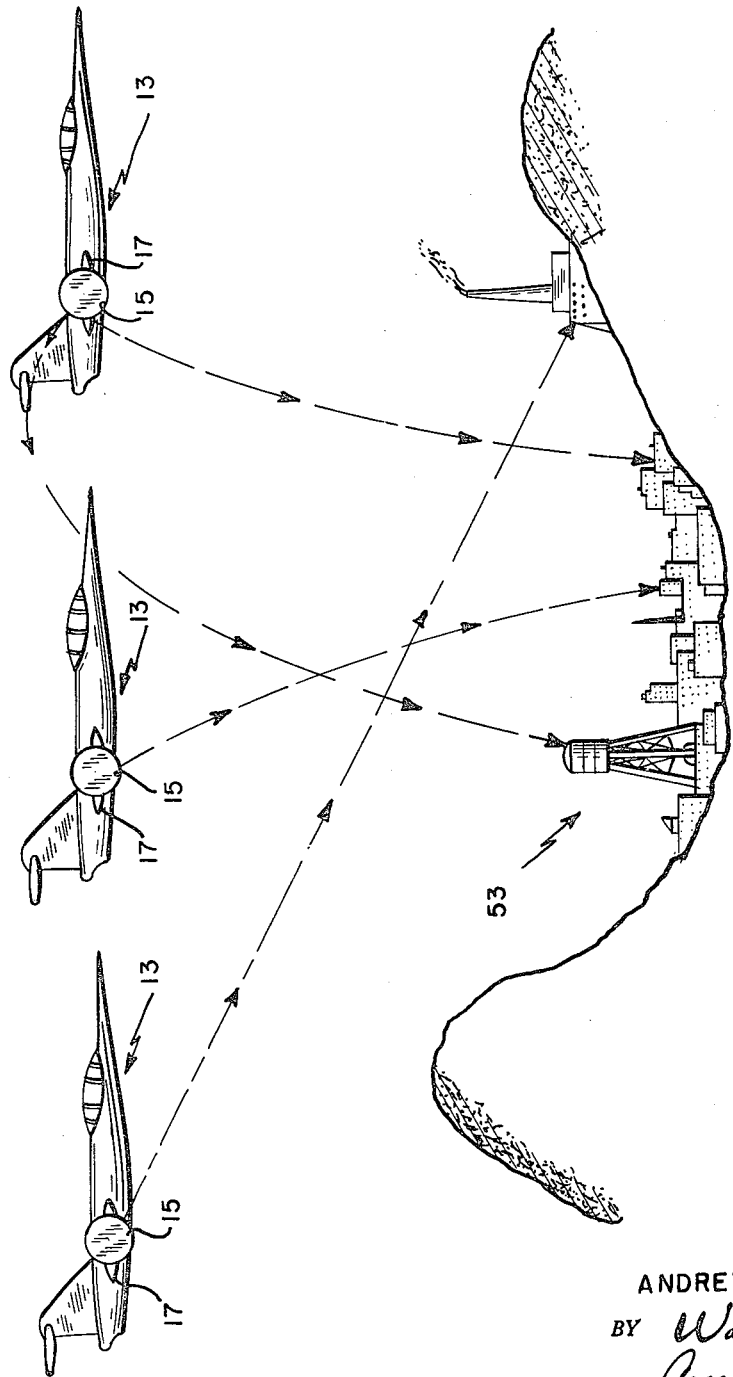
FIG. 6 is a view of aircraft equipped with the rocket launcher showing air-to-ground operation.

In FIG. 5 an alternate rocket tube arrangement is shown which allows for a greater capacity of rockets of smaller dimension. Under certain conditions this arrangement may be more desirable for offensive or defensive missions. An aircraft equipped with my invention is shown in FIG. 6 on an offensive mission against a ground target 53. From this drawing it can be easily seen that the potential fire power and tactical effect of fighter aircraft of conventional size can be increased to a point far beyond presently known limits.

Although only certain embodiments of my invention have been shown and described herein it will be apparent to those skilled in the art that various changes may be made in the construction and relative shape and size of the elements without departing from the true spirit and scope of the appended claims.

What I claim is:

1. In an aircraft having a fire control system, a body portion having wings extending outwardly therefrom, a rocket launching device rotatably attached to the outer extremity of the aircraft wing, comprising, a generally circular and streamlined pod having spaced walls for containing a plurality of rocket tubes, a plurality of rockets disposed within said rocket tubes, said rocket tubes serving to initially guide said rockets on launching from said pod, means for rotating said pod around a central axis substantially parallel to the wing member of said aircraft and generally perpendicular to the longitudinal axis of the fuselage of said aircraft including a drive system installed in the wing tip adjacent to said launching device, said drive system including a motor and a reduction gear transmission, a pinion gear extending from said transmission into said pod, a ring gear integral with said pod for engaging said pinion gear, said ring and pinion gears interacting to rotate said pod to a predetermined angular position, means for positively locking said pod in the predetermined angular firing position, and means for firing the rockets in response to a signal.

2. The combination defined in claim 1 wherein the means for positively locking the pod in the predetermined angular position comprises, an electrically operated index pin actuator including, an electromagnetic solenoid having a core member which extends from said actuator into said pod serving to prevent angular movement thereof, and signal means for retracting said core into said actuator when the electric motor in the drive system is energized.

References Cited in the file of this patent

UNITED STATES PATENTS

| | | |
|---|---|---|
| 2,450,551 | Harrington | Oct. 5, 1948 |
| 2,646,786 | Robertson | July 28, 1958 |
| 2,737,853 | Gravenhorst et al. | Mar. 13, 1956 |
| 2,763,189 | Grill | Sept. 18, 1956 |
| 2,771,811 | Lauritsen | Nov. 27, 1956 |
| 2,844,073 | Re et al. | July 22, 1958 |
| 2,858,737 | Tolomeo | Nov. 4, 1958 |